United States Patent [19]
Senninger

[11] Patent Number: 6,061,880
[45] Date of Patent: May 16, 2000

[54] WATER SUPPLY LINE FASTENER

[75] Inventor: Ralph B. Senninger, Lexington, Ky.

[73] Assignee: Plastic Productions A LLC, Lexington, Ky.

[21] Appl. No.: 09/084,632

[22] Filed: May 26, 1998

Related U.S. Application Data

[60] Provisional application No. 60/047,799, May 28, 1997.

[51] Int. Cl.[7] .............................. A44B 21/00; F16L 3/00
[52] U.S. Cl. ................. 24/339; 24/335; 24/336; 248/68.1
[58] Field of Search ............................ 24/339, 336, 335, 24/329, 324, 326; 248/68.1, 73

[56] References Cited

U.S. PATENT DOCUMENTS

| | | | |
|---|---|---|---|
| 451,097 | 4/1891 | Wilkinson | 24/339 |
| 1,795,884 | 3/1931 | Parker. | |
| 1,883,935 | 10/1932 | Kelley. | |
| 2,283,042 | 5/1942 | Burke. | |
| 2,394,240 | 2/1946 | Harrison. | |
| 2,447,025 | 8/1948 | Newman. | |
| 2,489,119 | 11/1949 | Burns, Jr. et al.. | |
| 3,160,175 | 12/1964 | Laemmle | 24/339 |
| 3,216,025 | 11/1965 | Roll. | |
| 3,385,545 | 5/1968 | Patton. | |
| 3,437,297 | 4/1969 | Jirka et al.. | |
| 3,778,537 | 12/1973 | Miller | 24/339 |
| 4,121,798 | 10/1978 | Schumacher et al. | 24/336 |
| 4,244,542 | 1/1981 | Mathews. | |
| 4,306,697 | 12/1981 | Mathews | 248/68.1 |
| 4,407,472 | 10/1983 | Beck. | |
| 4,467,988 | 8/1984 | Kraus. | |
| 4,618,114 | 10/1986 | McFarland | 248/73 |
| 4,707,892 | 11/1987 | Nelson | 24/336 |
| 4,864,697 | 9/1989 | Sparks et al. | 248/68.1 |
| 5,076,518 | 12/1991 | Washizu et al.. | |
| 5,507,460 | 4/1996 | Schneider | 248/73 |

*Primary Examiner*—Victor N. Sakran
*Attorney, Agent, or Firm*—King and Schickli, PLLC

[57] ABSTRACT

A fastener is provided for securing one or more water supply lines to a pipe, such as a drain or vent pipe. The fastener includes a first resilient clamping element for engaging the pipe and a second resilient clamping element for engaging the water line. The second resilient clamping elements may be unitary with the first resilient clamping elements or selectively connected together by means of a connector.

11 Claims, 2 Drawing Sheets

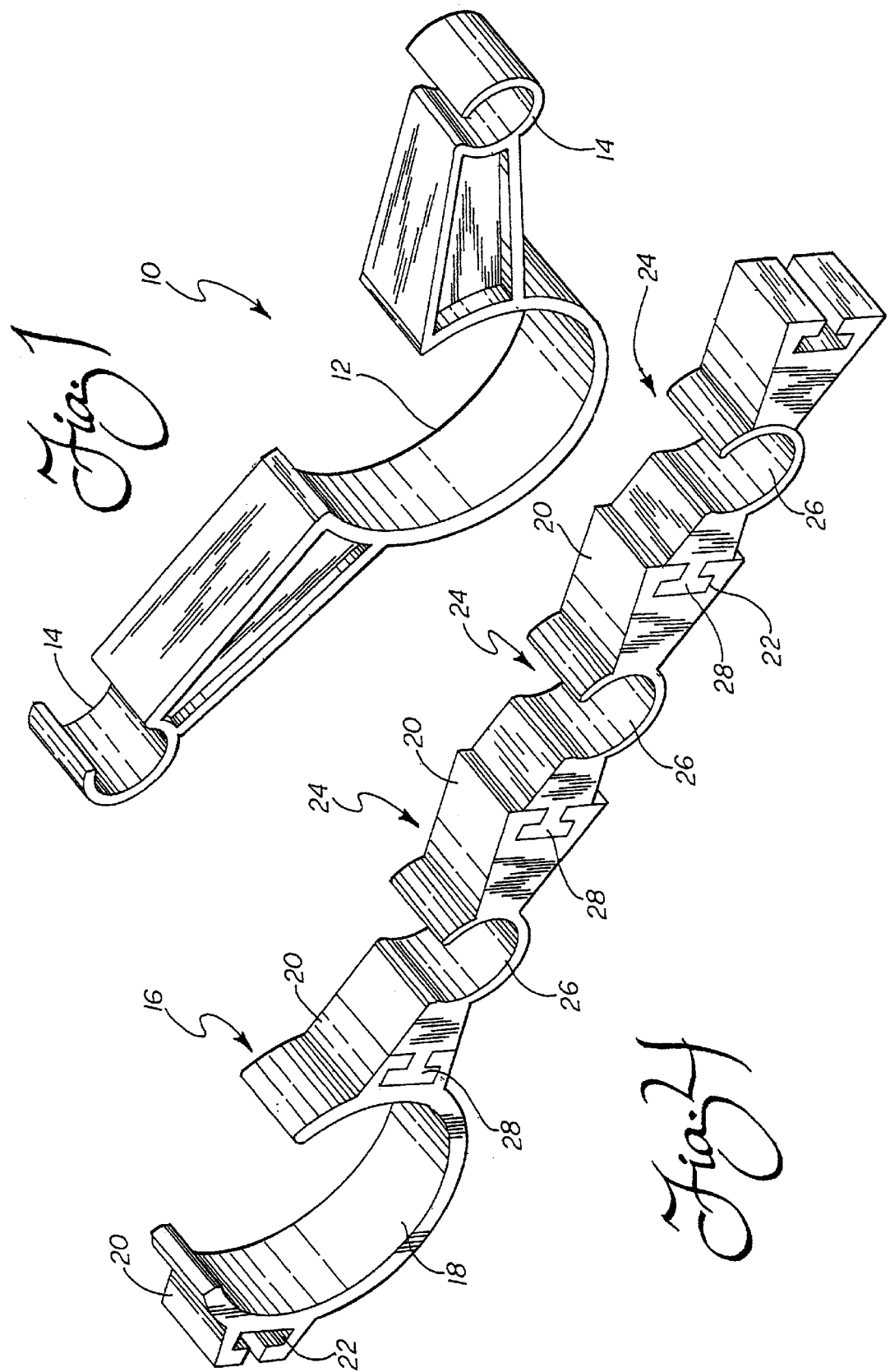

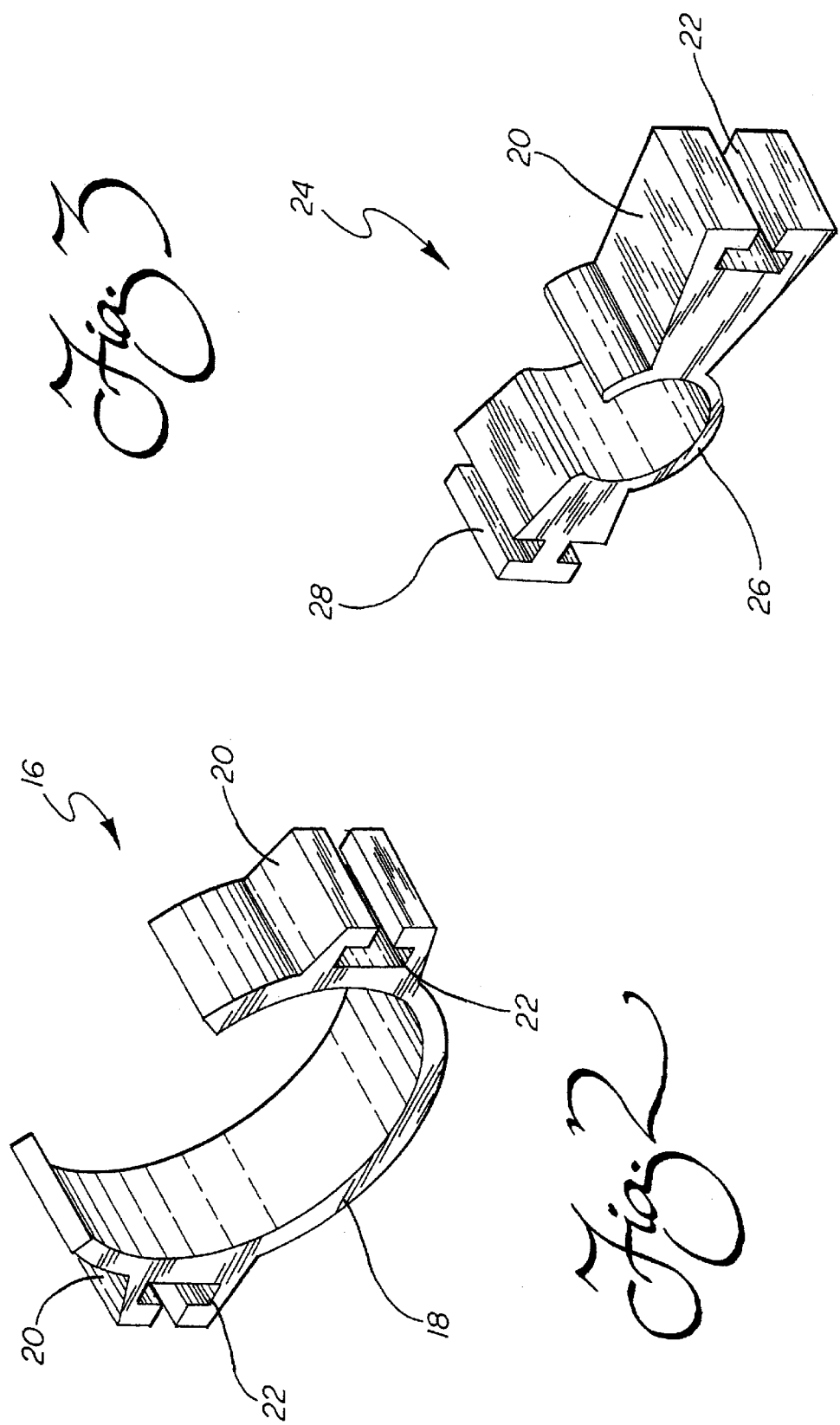

WATER SUPPLY LINE FASTENER

This application claims the benefit of U.S. Provisional Application Ser. No. 60/047,799, filed May 28, 1997, entitled "Water Supply Line Fastener."

TECHNICAL FIELD

The present invention generally relates to the plumbing field and, more particularly, to a new and improved fastener for securing a water line to a fixed pipe, such as a vent or drain pipe.

BACKGROUND OF THE INVENTION

In installing plumbing lines, it is important to secure fresh water supply lines in position against movement at the time of installing the roughed-in plumbing. This not only prevents movement of the lines when pouring light weight concrete around them or installing drywall along the wall studs, but also prevents subsequent movement and pipe rattling when operating a faucet to which the lines are connected.

To achieve this end, it has been found desirable in the past to anchor the fresh water supply lines to a drain or vent pipe by means of a relatively complicated clamping structure such as disclosed in U.S. Pat. No. 3,385,545 to Patton and U.S. Pat. No. 3,216,025 to Roll. As should be appreciated, these devices include a number of clamps which are secured together by means of separate fasteners, such as screws. This makes for an inconvenient and time consuming installation procedure. Further, the screws may be easily lost or misplaced, further frustrating attempts to achieve proper installation in a short period of time.

Because of the extensive time and resulting inconvenience often necessitated by utilizing bracket arrangements similar to those disclosed in the Patton and Roll patents, many plumbers simply shim and tape lines in position. While effective for the short term, such an approach is not durable and will often subsequently allow pipe movement resulting in rattling and clanging pipes within the wall as the fresh water faucet is turned on and off.

Therefore, a need is identified for an improved fastener for securing water supply lines in position. The fastener would be of simple, inexpensive construction and would be easily installed by the plumber without the use of tools or separate additional connectors. Moreover, the fasteners would be modular in design and, thus, adaptable for use for securing several water supply lines to a single pipe, if desired.

SUMMARY OF THE INVENTION

Accordingly, it is a primary object of the present invention to provide a fastener for securing a water line in a desired position within a wall or floor overcoming the above described limitations and disadvantages of the prior art.

Still another object of the present invention is to provide a relatively inexpensive as well as simple and convenient way to utilize a fastener for securing a water supply line to a pipe such as a vent or drain pipe in a quick and efficient manner without the use of separate fasteners such as screws, nuts and bolts, tie wire and the like which may become lost on the job site or work loose over time.

Yet another object of the present invention is to provide a fastener that is modular and adaptable to connect a plurality of water lines to a pipe.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved fastener is provided for securing a water line to a pipe, such as a fixed vent or drain pipe. The fastener includes a first resilient clamping element for engaging the pipe and a second resilient clamping element for engaging the water line. The first and second resilient clamping elements may be unitary; that is, integrally formed from a single piece of material. Preferably, however, means are provided for selectively connecting the first and second resilient clamping elements together.

More specifically, the first resilient clamping element ideally carries one or more first connecting elements in the form of a socket or slot. The second resilient clamping element carries a second connecting element including a cooperating projection that is snugly received in the socket/slot. The second resilient clamping element may also carry a first connecting element (i.e. socket or slot) for interconnecting with a second connecting element of a third clamping element that is similar in structure to the second clamping element.

Advantageously, the modular design provided by the interconnecting sockets/slots allows the installer to customize a fastener to meet the needs of any specific application. For example, one second resilient clamping element may be connected to each side of the first resilient clamping element. This allows a water supply line to be securely retained in position on each side of a drain or vent pipe. For other applications or where special space/clearance limitations exist, two or more water supply lines may be secured to one side of the drain or vent pipe. This is accomplished by attaching a series of second resilient clamping elements to one side of the first resilient clamping element. In any event, no matter how the clamping elements are secured, a snap fit is made by both on the water supply line and pipes, respectively. Accordingly, no separate or independent fasteners are required and, thus, the installation process is exceedingly convenient. Indeed, one man may effectively install a water line with little or no difficulty.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification illustrates several aspects of the present invention and, together with the description, serves to explain the principles of the invention. In the drawing:

FIG. 1 is a perspective view of the first embodiment of the present invention, including first and second resilient clamping elements formed from a single piece of resilient plastic material;

FIG. 2 is a perspective view of a second embodiment of the present invention showing the first resilient clamping element module for engaging a drain or vent pipe;

FIG. 3 is a perspective view of the second embodiment of the present invention showing the second resilient clamping element module for engaging a water supply line; and FIG. 4 is a perspective view of the second embodiment of the present invention showing a series of three modular second resilient clamping element modules connected to one side of a first resilient clamping element module.

Reference will now be made in detail to the present preferred embodiment of the invention, an example of which is illustrated in the accompanying drawing.

DETAILED DESCRIPTION OF THE INVENTION

Reference is now made to FIG. 1 showing a first embodiment of the fastener 10 of the present invention for securing a water supply line to a pipe such as a drain or vent pipe. As shown, the fastener 10 includes a first resilient clamping element 12. More specifically, the first resilient clamping element 12 forms a partial loop and is adapted to resiliently engage a drain or vent pipe.

Additionally, the fastener 10 includes at least one and preferably a pair of second resilient clamping elements 14. Each of the second resilient clamping elements 14 also form a partial loop and are adapted to resiliently engage a water supply line. As should be appreciated from reviewing FIG. 1, in this embodiment, the first and second resilient clamping elements 12, 14 are formed from a single piece of plastic material, such as, for example, polyvinyl chloride, CPVC, or ABS.

An alternative embodiment of the present invention wherein the fastener 10 consists of a series of interconnected modules is illustrated in FIGS. 24. More specifically, as shown in FIG. 2, a first resilient clamping element 16 comprises the first module. This module 16 includes a partial loop 18 shaped and sized for resiliently engaging a vent or drain pipe in the manner of the partial loop 12 of the first embodiment illustrated in FIG. 1. Additionally, each first resilient clamping element module 16 includes at least one, and preferably two, opposed first connecting elements 20, each forming a separate substantially T-shaped slot or socket 22.

Reference is now made to FIG. 3, showing a second resilient clamping element module 24 which includes a partial loop 26 that is sized and shaped to resiliently engage a water supply line in the same manner as the partial loop 14 of the first embodiment. Additionally, the second resilient clamping element module 24 includes or carries a second connecting element 28 comprising a substantially T-shaped projection that cooperates with and is snugly received in the socket/slot 22 carried on the first resilient clamping element module 16 shown in FIG. 2. Additionally, the second resilient clamping module 24 may also carry a first connecting element 20 which includes a substantially T-shaped slot or socket 22. Both the first and second resilient clamping element modules 16, 24 are preferably formed from a resilient plastic material such as polyvinyl chloride, CPVC, or ABS by means of injection molding or any other appropriate procedure known in the art.

As should be appreciated, the second embodiment of the present invention provides a number of unique and distinct advantages. Specifically, the fastener 10 may be customized to meet the particular needs of the installer for substantially any application. For example, as shown in FIG. 4, a series of second resilient clamping element modules 24 may be interconnected by means of the cooperating first and second connecting elements 20, 28 carried thereon. The entire series of interconnected second resilient clamping element modules 24 may then be connected to one side of a first resilient clamping element module 16 by sliding the projecting connecting element 28 on the series of modules 24 into the T-shaped slot or socket 22 of the first connecting element 20 carried on the first resilient clamping element. Accordingly, three water lines may be secured adjacent to and in alignment along one side of a vent or drain pipe by means of the construction shown in FIG. 4.

Of course, a larger or smaller number of water supply lines may be secured along that same side by simply adding or removing one or more second resilient clamping element modules 24. Similarly, one or more water supply lines may be secured to the opposite side of the first resilient clamping element module 16 (and, therefore, the vent or drain pipe to which the clamping element 16 is mounted) by securing one or more of the second resilient clamping element modules 24 to the opposite first connecting element 20.

Thus, it should be appreciated that the second, modular construction of the fastener 10 of the present invention essentially allows custom installation that meets the requirements of substantially any and all installations. Further, the fastener 10 is convenient and easy to use since it merely snaps into position without using separate fasteners or any other component. Specifically, after the plumber has installed the drain or vent pipe in the wall or floor of the building under construction, the fastener 10 of either the first and/or second embodiment is simply snapped over the drain or vent pipe in the desired position. The fastener 10 is manipulated so that the open portion of the loop 12 or 18 is aligned with the vent or drain pipe. Pressure is then applied to force the loop 12 or 18 over the drain or vent pipe. As this is done, the resilient material from which the fastener 10 is constructed allows the opening to the loop 12 or 18 to expand thereby allowing the passage of the pipe into the loop. Once in position, the resilient material returns through resilient memory to its original position and snugly engages on the drain or vent pipe. The plumber may then simply lay out the water line in a simple and efficient manner by similarly snapping the water supply line(s) in position in the loop 14 or 26 of the second resilient clamping element. Since no fasteners are required, installation is much more efficient and convenient and far less labor intensive, which serves to significantly reduce installation costs.

In summary, an improved fastener 10 is provided for securing a water supply line to a pipe, such as a drain or vent pipe. The fastener 10 includes a first resilient clamping element 12, 16 for engaging the pipe and one or more second resilient clamping elements 14, 24 for engaging the water line(s). These resilient clamping elements may be unitary (see FIG. 1) or they may be selectively connected together by means of connectors (see FIGS. 2–4). As should be appreciated from reviewing the above disclosure, the fastener provides a relatively inexpensive, simple and convenient way to secure a water supply line to a pipe in a quick and efficient manner without the use of separate fasteners.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

I claim:

1. A fastener for securing a water supply line to a pipe, comprising:
   a first resilient clamping element having an open loop portion for engaging said pipe by snap-fit action,
   a second resilient clamping element having an open loop portion for engaging said water supply line by snap-fit action; and
   an integrally formed laterally projecting connector arm extending between said open loop portion of said first resilient clamping element and said open loop portion of said second resilient clamping element:
   wherein a straight line drawn radially through the open loop portion of said first resilient clamping element along said connector arm also intersects the open loop portion of said second resilient clamping element;
   whereby a low-profile fastener is provided.

2. The fastener of claim 1 wherein said first and second resilient clamping element loop portions open in the same direction.

3. A fastener for securing a water supply line to a pipe, comprising:
   a first resilient clamping element having an open loop portion for engaging said pipe by snap-fit action;
   at least one first connecting element integrally formed with said open loop portion of said first resilient clamping element;
   at least one second resilient clamping element having an open loop portion for engaging said water supply line by snap-fit action; and
   a second resilient connecting element integrally formed with said open loop portion of said second resilient clamping element, said first and second connecting elements cooperating to form a connection;
   wherein a straight line drawn radially through the open loop portion of said first resilient clamping element along the connection formed between said first and second connecting elements also intersects the open loop portion of said second resilient clamping element;
   whereby a low-profile fastener is provided.

4. The fastener of claim 3, wherein said first resilient clamping element carries two first correcting elements.

5. The fastener of claim 4, wherein said two first connecting elements are bilaterally opposed.

6. The fastener of claim 4, wherein each of said first connecting elements includes a socket and each of said second connecting elements includes a cooperating projection, said cooperating projection snugly fitting within said socket.

7. The fastener of claim 6, wherein each of said sockets and said projections is substantially T-shaped.

8. The fastener of claim 3, wherein said second resilient clamping element also carries a first connecting element.

9. The fastener of claim 3 wherein said first and second resilient clamping element loop portions open in the same direction.

10. A unitary fastener for securing a water supply line to a pipe comprising:
    a first resilient clamping element having an open loop portion for engaging said pipe by snap-fit action;
    a second resilient clamping element having an open loop portion for engaging said water supply line by snap fit action; and
    a connector arm extending between said first and second clamping elements, said connector arm extending angularly outwardly from the open loop portion of said first resilient clamping element;
    whereby said first and second clamping elements operate by snap fit action and without the use of any separate fastener elements.

11. The fastener of claim 10 wherein said first and second resilient clamping element loop portions open in the same direction.

* * * * *

UNITED STATES PATENT AND TRADEMARK OFFICE
CERTIFICATE OF CORRECTION

PATENT : 6,061,880
DATED : May 16, 2000
INVENTOR(S) : Ralph B. Senninger

It is certified that error appears in the above-identified patent and that said Letters Patent is hereby corrected as shown below:

Claim 1, Column 5, line 12, replace the "," with a -- ; --.
Claim 1, Column 5, line 16, between the words "formed" and "laterally" insert a -- , --.
Claim 1, Column 5, line 19, replace the " : " with a -- ; --.
Claim 3, Column 5, line 38, delete "resilient".
Claim 4, Column 6, line 8, change "correcting" to -- connecting --.

Signed and Sealed this

Twentieth Day of March, 2001

Attest:

NICHOLAS P. GODICI

*Attesting Officer*    *Acting Director of the United States Patent and Trademark Office*